(12) United States Patent
Sebastian et al.

(10) Patent No.: US 9,851,433 B2
(45) Date of Patent: Dec. 26, 2017

(54) SINGLE LASER LIDAR SYSTEM

(71) Applicant: DSCG Solutions, Inc., Chantilly, VA (US)

(72) Inventors: Richard Sebastian, Frederick, MD (US); Kendall Belsley, Falls Church, VA (US)

(73) Assignee: DSCG Solutions, Inc., Chantilly, VA (US)

( * ) Notice: Subject to any disclaimer, the term of this patent is extended or adjusted under 35 U.S.C. 154(b) by 450 days.

(21) Appl. No.: 14/575,642

(22) Filed: Dec. 18, 2014

(65) Prior Publication Data

US 2015/0177367 A1  Jun. 25, 2015

Related U.S. Application Data

(60) Provisional application No. 61/918,525, filed on Dec. 19, 2013.

(51) Int. Cl.
*G01C 3/08* (2006.01)
*G01S 7/481* (2006.01)
(Continued)

(52) U.S. Cl.
CPC .......... *G01S 7/4814* (2013.01); *G01S 7/493* (2013.01); *G01S 17/06* (2013.01); *G01S 17/325* (2013.01); *G01S 17/58* (2013.01)

(58) Field of Classification Search
CPC ........ G01S 7/4814; G01S 7/493; G01S 17/06; G01S 17/58; G01S 17/325
(Continued)

(56) References Cited

U.S. PATENT DOCUMENTS 4,733,609 A  3/1988  Goodwin et al.
7,307,700 B1 *  12/2007  Leep ................... G01R 23/16
  356/5.01
(Continued)

FOREIGN PATENT DOCUMENTS

DE   4330425 A1   3/1994
JP   6-160445 A   6/1994
WO   2009/040144 A1   4/2009

OTHER PUBLICATIONS

International Search Report and Written Opinion received for PCT application No. PCT/US2014/071560, dated Mar. 20, 2015, 38 pages.
(Continued)

*Primary Examiner* — Mark Hellner
(74) *Attorney, Agent, or Firm* — Brake Hughes Bellermann LLP

(57) ABSTRACT

In one general aspect, a non-transitory computer-readable storage medium storing instructions that when executed cause one or more processors to perform a process. The process can include producing emitted electromagnetic radiation based on a frequency pattern and receiving reflected electromagnetic radiation reflected from an object. The process can include defining combined frequency data based on a frequency of the emitted electromagnetic radiation and a frequency of the reflected electromagnetic radiation. The process can also include defining a set of spectral bins, based on a Fourier transform, in a frequency domain based on the combined frequency data, and can include identifying a subset of the set of spectral bins.

22 Claims, 4 Drawing Sheets

(51) Int. Cl.
*G01S 17/06* (2006.01)
*G01S 17/58* (2006.01)
*G01S 17/32* (2006.01)
*G01S 7/493* (2006.01)

(58) Field of Classification Search
USPC .......................................................... 356/5.09
See application file for complete search history.

(56) References Cited

U.S. PATENT DOCUMENTS

| | | | |
|---|---|---|---|
| 7,742,152 B2* | 6/2010 | Hui .................. | G01S 7/4917 356/5.09 |
| 2007/0132630 A1* | 6/2007 | Beckner ............ | G01S 7/024 342/22 |
| 2007/0273863 A1 | 11/2007 | Leep et al. | |
| 2008/0018881 A1* | 1/2008 | Hui .................. | G01S 7/4917 356/5.09 |
| 2012/0194833 A1* | 8/2012 | Hara ................ | H04N 1/6036 358/1.9 |

OTHER PUBLICATIONS

Raoul et al., "Double Laser Diode Speed Sensor for Contact Less Measures of Moving Targets", Proceedings of SPIE vol. 4827, 2002, pp. 363-373.
Wang et al., "Effects of Speckle on The Range Precision of a Scanning Lidar", Applied Optics, vol. 31, No. 6, Feb. 20, 1992, pp. 801-808.

* cited by examiner

SINGLE LASER LIDAR SYSTEM

RELATED APPLICATION

This application claims priority to and the benefit of U.S. Provisional Application No. 61/918,525, filed on Dec. 19, 2013, and entitled, "Single Laser LIDAR System", which is incorporated by reference herein in its entirety.

TECHNICAL FIELD

This description relates to a single laser LIght Detection And Ranging (LIDAR) system.

BACKGROUND

In some known LIDAR systems, multiple lasers are may be used to estimate range and velocity of moving objects. However, even with the use of multiple lasers, the range and velocity estimates can be distorted by, for example, multipath effects or other interference. Also, because laser components are complex and costly, the use of multiple lasers in a LIDAR system can be expensive and relatively difficult to maintain. Thus, a need exists for systems, methods, and apparatus to address the shortfalls of present technology and to provide other new and innovative features.

SUMMARY

In one general aspect, a non-transitory computer-readable storage medium storing instructions that when executed cause one or more processors to perform a process. The process can include producing emitted electromagnetic radiation based on a frequency pattern and receiving reflected electromagnetic radiation reflected from an object. The process can include defining combined frequency data based on a frequency of the emitted electromagnetic radiation and a frequency of the reflected electromagnetic radiation. The process can also include defining a set of spectral bins, based on a Fourier transform, in a frequency domain based on the combined frequency data, and can include identifying a subset of the set of spectral bins.

DETAILED DESCRIPTION

Figure 1:
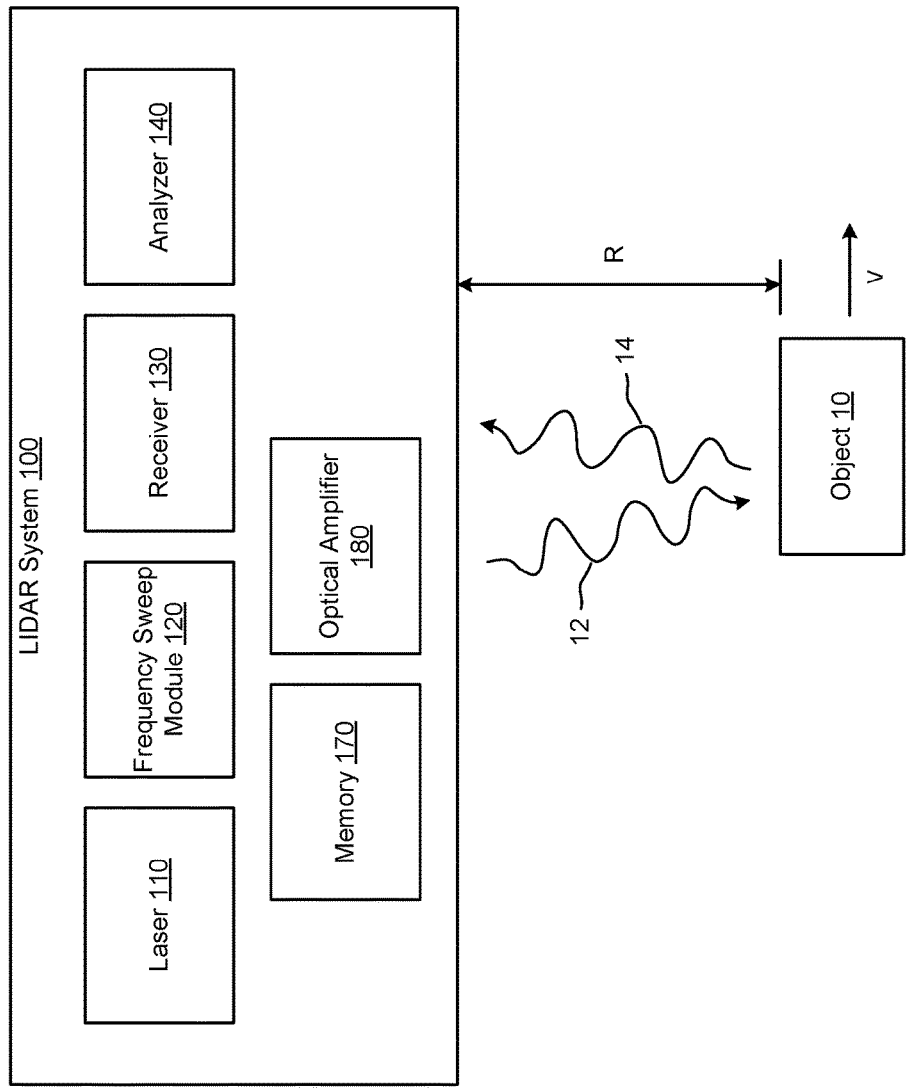
FIG. 1 is a diagram that illustrates a LIDAR system.

A single laser Frequency Modulated Continuous-Wave (FMCW) LIght Detection And Ranging (LIDAR) system having improved processing for range and velocity estimates is described herein. These LIDAR systems and methods described herein can mitigate problems in range and velocity estimation that arise from, for example, multipath effects of target beam propagation.

An FMCW LIDAR employing a laser diode may have its transmitted light signal sweep in optical frequency by modulating the drive current of the laser. Generally, the optical power of the laser output will change significantly during the frequency sweep as a result of the drive current modulation.

In an idealized FMCW application, the laser frequency sweeps linearly in time and the laser output power is constant. The return signal from the target is mixed with a portion of the transmitted signal to obtain a constant frequency beat signal. The beat frequency will be a sum of a signal frequency change over the round trip to the target and back, plus the Doppler frequency shift resulting from relative range motion between the LIDAR and the target.

In a real application the return signal from the target is a sum of multipath components resulting from a spread of the LIDAR beam spot on the target and/or any penetration of the LIDAR beam into the target surface. The range spread of LIDAR signal components will generally be over several wavelengths and the coherent sum of the components can be near extinction or distorted in phase so that a speckle minimum or "fade" occurs. The interference between signal components is a function of wavelength. Therefore, the interference will vary in time as the LIDAR chirp goes through a frequency sweep (e.g., a linear frequency sweep, a non-linear frequency sweep, a frequency sweep based on, for example, a pre-defined profile, pattern, or equation).

Using known methods, if a speckle amplitude or phase distortion event occurs during the chirp, the detected beat frequency phase and amplitude are also perturbed, resulting in erroneous frequency estimates. This leads, in turn, to erroneous range and velocity estimates.

In the LIDAR systems and methods described herein, a variety of procedures, which are presented by way of example, may be used in any combination. In some implementations, the spectrum bins near the spectrum peak are used through an inverse Fourier transform to estimate the complex time series of the chirp. Because this estimated time series contains frequencies near the spectrum peak and with high power density, it will have a much higher Signal-to-Noise Ratio (SNR) than the original sweep time series. Angle versus time can be derived for the estimated time series. In some implementations, the improved SNR provides a repeatable, stable estimate of phase across the chirp that can be used to derive an improved estimate of signal frequency. With no signal fade, angle versus time may be a linear curve. Regions of the angle versus time that are not consistent with the linear curve can be detected by signal processing methods such as, for example, regression analysis. In some implementations, these sections of the signal sweep can then be removed and the spectral analysis repeated, without the offending signal section, to derive an improved estimate of beat frequency.

In some implementations, multipath effects can produce phase and amplitude variations during the chirp, especially signal fades. Even if there is no phase distortion and only a large amplitude reduction during a signal fade, there will, nevertheless, be a perturbation of the beat frequency estimate. This can be because, interpolated spectrum frequency estimates from zero filled Fast Fourier Transform (FFT) processing can be distorted for frequencies that do not lie on a spectrum bin. Low amplitude data has the same effect as changing the amount of zero filling. In some implementations, the low amplitude section of the time series can be removed, a new zero-filled FFT generated, and the frequency bias adjustment used to correct for the shorter data segment.

In some implementations, the sections of the sweep time series that do not have the same phase angle versus time trend as the rest of the sweep (may also be known as outliers) can be eliminated and a Discrete Fourier Transform (DFT) computed from the remaining time series points.

In some implementations, the sweep time series can be broken into sections and a time domain or frequency domain approach used to estimate the phase trend of each section. In some implementations, to improve the frequency estimate, sections with outlier phase trends are eliminated and a DFT is used to estimate frequency based upon the remaining good sections.

In some implementations, a DFT using only sweep data, no zero filling, can be used to obtain an unbiased spectrum estimate. In some implementations, once the close bins are determined using an FFT, a DFT for key bins can be used to get an estimate with relatively little bias.

In some implementations, benefits of the LIDAR system described herein can be, for example, higher measurement rate, higher chirp rate, optical amplification of laser source, and/or so forth. Some of these advantages of the LIDAR system and methods are described in more detail below.

Faster chirp rate (i.e. more chirps per second, or more beat frequency estimates per second), in some implementations, reduces the impact of acceleration on velocity measurement to the point where the effect is negligible for ordinary motions of subjects and for steering mirror motions. In some implementations, linear predictive algorithms further improve the deconvolution of range and velocity measurements so that simultaneous counter-chirp measurements are typically not required for accurate range determination. With simultaneous counter-chirping using multiple laser beams (in known multi-laser systems), reduced power may be required (on each of the multiple laser beams) to collectively remain within safe operating limits (e.g., eye safety limits). The reduced power for each of the multiple lasers may result in reduced SNR for each of the lasers because the laser signals will each have reduced power. In the single laser LIDAR systems described herein, the power may be at a relatively high level or increased level for the single laser (as compared with a multi-laser system (e.g., double that of a dual-laser system)), without moving outside of safe operating limits. The relatively high power (which in some instances can be amplified using an optical amplifier) on the single laser LIDAR system can allow for improved SNR of the single laser LIDAR system.

Optical amplifier(s), in some implementations, allow the distribution of a single laser to a large number of measurement channels.

Optical amplifier(s), in some implementations, provide the ability to change the system optical power output to overcome weak signal returns. For example, transmission through a window may attenuate the LIDAR beam of the LIDAR system Increasing the optical power output can help to mitigate the effect of this optical loss. In some implementations, the power output of the Distributed Feedback (DFB) lasers used as the LIDAR optical source cannot be changed directly without degrading the chirp characteristics of the optical output.

Optical amplifier(s), in some implementations, can reduce the amplitude modulation (e.g., enable a relatively stable amplitude) of chirped laser output through gain saturation. The optical amplifier(s) can also enable better control of an amplitude of a laser output and a more desirable (e.g., a relatively flat) time series estimate. In some implementations, reduced amplitude modulation (and a more stable amplitude) improves measurement quality by keeping the SNR high throughout chirp and effectively increasing the time-bandwidth product of each measurement. The net effect, in some implementations, can be a more accurate estimated bandwidth.

The linear predictive methods and systems described herein can remove systematic differences between consecutive up and down chirps that previously degraded the separation of velocity and range in known systems. The LIDAR methods and systems described herein have many advantages over simultaneous counter-chirp methods and systems. In some implementations, an optical amplifier can be used as part of the LIDAR system (and methods) while still maintaining high quality frequency chirping of the laser output as measured after the optical amplifier.

FIG. 1 is a diagram that illustrates a LIDAR system 100 configured to use a laser 110 (which can be referred to as a laser source), which is a single laser, to produce or measure a range R and/or a velocity V (or velocity estimate) of an object 10 that can be stationary or moving with respect to the LIDAR system 100. In some implementations the range R can be a range estimate and the velocity V can be a velocity estimate. In some implementations the range R can be an accurate range estimate and the velocity V can be an accurate velocity estimate. In some implementations, the object 10 can be referred to as a target or as a target object. The LIDAR system 100 is configured to produce accurate range estimates and/or accurate velocity estimates despite, for example, multipath effects associated with electromagnetic radiation from the laser 110 and/or other interference that can arise during measurements. Details related to the components and methods that enable the range estimates and/or velocity estimates of the object 10 by the LIDAR system 100 are described below.

The laser 110 of the LIDAR system 100 is configured to emit (e.g., produce, propagate) electromagnetic radiation at one or more frequencies that can be, for example, a coherent light emission (e.g., monochromatic light emission) or beam. For simplicity, the emissions from the laser 110 will be referred to as an electromagnetic radiation emission (such as electromagnetic radiation emission 12), as emitted electromagnetic radiation, or as transmitted electromagnetic radiation.

As shown in FIG. 1, the LIDAR system 100 includes a frequency sweep module 120. The frequency sweep module 120 is configured to trigger the laser 110 to produce a variety of optical frequencies (also can be referred to generally as frequencies), for example, by modulating a drive current of the laser 110. Specifically, the frequency sweep module 120 is configured to trigger laser 110 to produce a pattern of optical frequencies (also can be referred to as a frequency pattern). For example, the frequency sweep module 120 can be configured to trigger the laser 110 to produce a sinusoidal wave pattern of optical frequencies, a sawtooth wave pattern of optical frequencies, and/or so forth. In some implementations, the sawtooth wave pattern can have a portion continuously increasing (e.g., monotonically increasing, linearly increasing, increasing nonlinearly) in optical frequency (also can be referred to as up-chirp) and can have a portion continuously decreasing (e.g., monotonically decreasing, linearly decreasing, decreasing nonlinearly) in optical frequency (also can be referred to as down-chirp). Accordingly, the frequency pattern (or signal) can have a cycle including an up-chirp and a down-chirp. The optical power of the laser output can change significantly during a frequency sweep as a result of the drive current modulation.

The LIDAR system 100 can be used in a frequency modulated continuous wave (FMCW) application. In such FMCW applications, the frequency pattern of electromagnetic radiation emitted from the laser 110 can sweep linearly (e.g., substantially linearly) in time and the power output of the laser 110 can be constant (e.g., substantially constant). In some implementations, instructions executed by the frequency sweep module 120 can be stored in and accessed from a memory 170. For example, in some implementations, the frequency sweep module 120 can be configured to use a frequency pattern stored in the memory 170 to trigger the laser 110 to produce a sweep of optical frequencies including an up-chirp and a down-chirp.

The LIDAR system 100 includes a receiver 130 (which can include one or more combiners) configured to receive electromagnetic radiation 14 reflected (also can be referred to as reflected electromagnetic radiation 14) from the object 10 in response to electromagnetic radiation 12 emitted from the laser 110 toward the object 10. In some implementations, the reflected electromagnetic radiation 14 (also can be referred to as a return signal or return light) from the object 10 is mixed with a portion of the emitted electromagnetic radiation 12. In some implementations, the receiver 130 can include one or more detectors (not shown) configured to convert detected radiation into one or more electrical signals that can be analyzed by the analyzer 140. Although analysis is described in some portions of this description in terms of being performed on, for example, radiation, frequencies, etc., the analysis can, in some implementations, be performed on signals (e.g., electrical signals) derived therefrom and/or representing the radiation, frequencies, etc.

An analyzer 140 of the LIDAR system 100 is configured to analyze a combination of emitted electromagnetic radiation 12 (e.g., an emitted electromagnetic radiation signal derived therefrom) from the laser 110 and reflected electromagnetic radiation 14 (e.g., a reflected electromagnetic radiation signal derived therefrom) received by the receiver 130. The emitted electromagnetic radiation 12 can be emitted in accordance with a pattern including an up-chirp followed by a down-chirp (or a down-chirp followed by an up-chirp). The combination of a frequency of the emitted electromagnetic radiation 12 from the laser 110 and a frequency of the reflected electromagnetic radiation 14 can be analyzed by the analyzer 140 to obtain or define a beat frequency or signal. In other words, the beat frequency can be a sum of a signal frequency change over the round trip to an object (emitted electromagnetic radiation 12) and back (reflected electromagnetic radiation 14), and may include a Doppler frequency shift of the reflected electromagnetic radiation 14 resulting from relative range motion between the LIDAR system 100 and the object 10. In some implementations, the beat signal can have a relatively constant frequency or a varying frequency. In some implementations, a combination of a frequency of emitted electromagnetic radiation 12 and a frequency of reflected electromagnetic radiation 14 can be referred to as a combined frequency (or signal) or as a round-trip frequency (or signal). The combined frequency can be represented as combined frequency data (which can be a type of time series data).

The analyzer 140 is also configured to analyze the combination of frequencies of emitted electromagnetic radiation 12 and reflected electromagnetic radiation 14 that can be subject to additional interference or perturbations. For example, a frequency of the reflected electromagnetic radiation 14 from the object 10 can include multipath components (e.g., a combination or some of multipath components) resulting from a spread of a beam spot of the emitted electromagnetic radiation 12 on the object 10 and/or any penetration of the emitted electromagnetic radiation 12 into a surface of the object 10. The range spread of components (also can be referred to a signal components) of the emitted electromagnetic radiation 12 will generally be over several wavelengths and the coherent sum of the components can be near extinction or distorted in phase so that a speckle minimum or fade occurs. This interference between components can be a function of wavelength. Therefore, the interference can vary in time in response to a frequency pattern including a linear frequency sweep (including an up-chirp and/or a down-chirp) of an optical frequency of the emitted electromagnetic radiation 12 of the laser 110.

The functionality of the analyzer 140 is also configured to handle processing of a combined frequency (which is a combination of a frequency of emitted electromagnetic radiation 12 and a frequency of reflected electromagnetic radiation 14) that is perturbed in phase and/or in amplitude by a speckle amplitude and/or phase distortion event occurring during execution of a frequency pattern of the emitted electromagnetic radiation 12. The analyzer 140 is configured to perform spectral analysis to handle the unique Signal-to-Noise-Ratio (SNR) conditions that can arise from interference.

Using some existing methods and apparatus, an entire frequency pattern is processed with Fourier analysis to determine a beat frequency. If a speckle amplitude and/or phase distortion events occur during the frequency pattern, the detected beat frequency phase and amplitude are also perturbed, resulting in a distorted peak after the Fourier analysis. Use of some existing methods and apparatus can lead to anomalous beat frequency, which can in turn, result in relatively inaccurate range and velocity estimates.

In some implementations, the methods and apparatus disclosed herein can result in, or enable, for example, a relatively high measurement rate and/or a relatively high cycle rate of frequency pattern (e.g., relatively short duration of a cycle of a frequency pattern, relatively high of chirp rate) compared with, for example, a multi-laser LIDAR system. For example, a relatively fast chirp rate can reduce an impact of acceleration or deceleration on velocity measurement to a point where the effect can be negligible for motions of (e.g., ordinary motions of) the object 10 and for steering mirror motions included in the LIDAR system 100. The predictive algorithms (e.g., linear predictive algorithms) described herein can further improve the de-convolution of range and velocity measurements so that simultaneous counter-chirp measurements (e.g., using multiple lasers) are not required for accurate range determination.

As described herein, the spectral analysis methods (e.g., linear predictive method) and associated apparatus (e.g., LIDAR system 100) can be configured to remove systematic differences between, for example, consecutive up-chirps and down-chirps within a frequency pattern that previously degraded the separation of velocity and range. The spectral analysis and methods and apparatus described herein are advantageous over simultaneous counter-chirp methods using multi-laser LIDAR systems.

Figure 2:
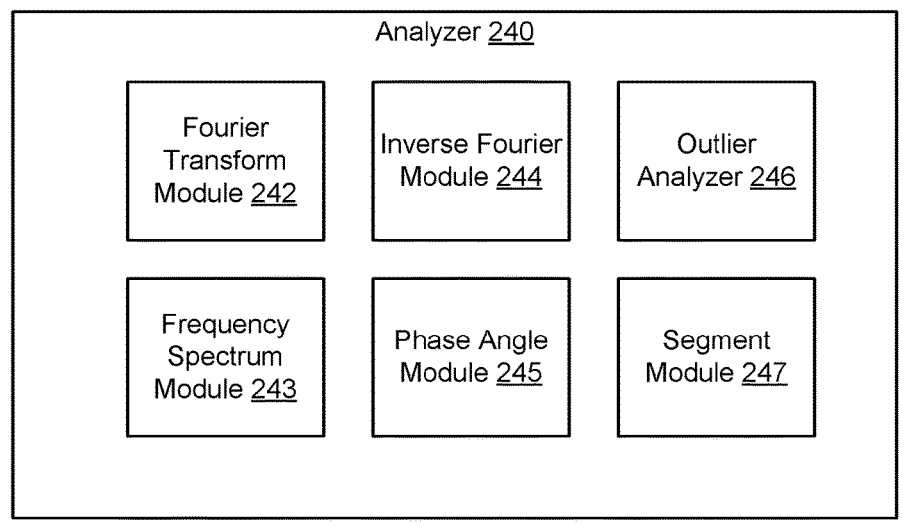
FIG. 2 is a diagram that illustrates an example of an analyzer configured to perform a spectral analysis.

FIG. 2 is a diagram that illustrates an example of an analyzer 240 configured to perform a spectral analysis. The analyzer 240 can be used in the LIDAR system 100 shown in FIG. 1. Analysis performed by the components of the analyzer 240 can be referred to as a spectral analysis. In some implementations, the spectral analysis, or portions thereof, can be iteratively performed. The iterations can be performed until a beat frequency (or other target data or frequencies) has been determined (based on one or more threshold conditions). In some implementations, the iterations of the spectral analysis can be performed until a specified numbers of iterations have been performed.

The analyzer 240 is configured to calculate a combined frequency (not shown) based on radiation received by a receiver such as the receiver 130 shown in FIG. 1. The combined frequency can be a combination of, for example, a frequency of emitted electromagnetic radiation 12 and a frequency of reflected electromagnetic radiation 14 shown in FIG. 1.

Figure 3A:
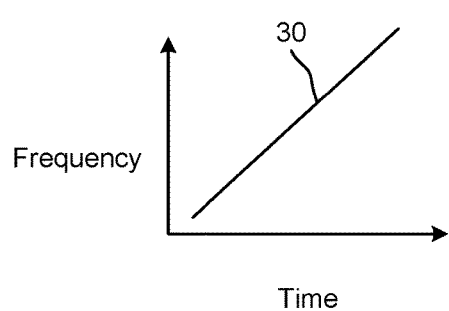
FIGS. 3A through 3D are graphs associated with a spectral analysis.

The emitted electromagnetic radiation can be produced based on a frequency pattern 30 (also can be referred to as a frequency sweep) such as that shown in FIG. 3A. Although the frequency pattern 30 shown in FIG. 3A illustrates only an up-chirp, in some implementations, a frequency pattern can include an up chirp and/or a down-chirp. A frequency pattern can be different than that shown in FIG. 3A. For example, a frequency pattern can have a different slope, can be over a shorter duration, can be nonlinear, can have a curved pattern, can have a stepwise pattern, and/or so forth.

The analyzer 240 includes a Fourier transform module 242 configured to perform a Fourier analysis (e.g., Discrete Fourier Transform (DFT)) on the combined frequency produced by the analyzer 240. The Fourier transform module 242 is configured to convert time data of the combined frequency into a frequency domain. For example, the Fourier transform module 242 is configured to produce power density versus frequency data 31 such as that graphically illustrated in FIG. 3B. In some implementations, the power density versus frequency data can be represented mathematically and can be stored in a memory such as memory 170 shown in FIG. 1.

Figure 3B:
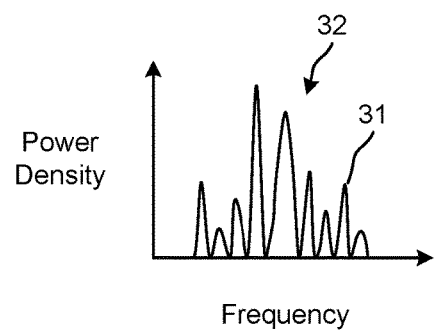

The analyzer 240 includes a frequency spectrum module 243 configured to produce (e.g., define) or analyze spectral bins 32 based on the power density versus frequency data 32. In some implementations, the spectral bins 32 or portions can correspond with power density peaks (and can be generally centered around a specific frequency and can span a range of frequencies), which are illustrated in FIG. 3B. In some implementations, the spectral bins 32 can be referred to as a set of spectral bins 32.

In some implementations, the segment module 247 can be configured to eliminate (e.g., discard, exclude) at least a portion of the power density versus frequency data 31 for subsequent analysis based on the spectral bins 32. In other words, the segment module 247 can be configured to select a subset of the power density versus frequency data 31 for subsequent analysis. The selection of subset of the power density versus frequency data 31 can be based on the spectral bins 32. As a specific example, power density versus frequency data 31 associated with spectral bins 32 that are disposed around a spectrum peak can be selected for subsequent analysis. In some implementations, the selection can be based on spectral bins 32 that are closest to a highest (e.g., maximum peak) spectral bin from the entire set of spectral bins 32. In some implementations, spectral bins relatively far away from a highest spectral bin can be eliminated (e.g., discarded, excluded). In some implementations, a subset of the set of spectral bins 32 can be selected based on one or more criteria such as an amplitude or power density criteria, a criteria of a specified number of bins to be selected, and/or so forth. In some implementations, a subset of the set of spectral bins 32 can be selected based on distance (in frequency) from a relatively high (or maximum) frequency peak. In some implementations, the segment module 247 can be configured to select a subset of the spectral bins 32 that correspond with relatively high power densities or amplitudes. In some implementations, the subset can include one or more spectral bins from the set of spectral bins 32.

The power density versus frequency data 31 associated with the selected spectral bins 32, which can include all of the bins or a subset of the spectral bins, can be processed using an inverse Fourier module 244 of the analyzer 240.

Figure 3C:
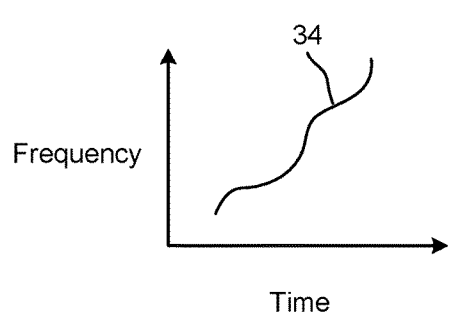

The inverse Fourier module 244 can be configured to produce (e.g., calculate) time series data based on the selected spectral bins. In some implementations, the time series data can be referred to as a complex time series or as estimated time series data. In some implementations, the time series data can represent an estimate of a complex time series of the frequency pattern illustrated in FIG. 3A. A graphical representation of an example of time series data 34, which includes frequency versus time, is illustrated in FIG. 3C.

If the time series data includes only data associated with a subset of spectral bins, the time series data can have a relatively high or improved SNR compared with the original frequency pattern. As an example, as shown in FIG. 3C, the time series data 34, although having generally the same direction and form as the frequency pattern shown in FIG. 3A, has inflections that vary from the frequency pattern 30 illustrated in FIG. 3A.

As shown in FIG. 2, the analyzer 240 includes a phase angle module 245. The phase angle module is configured to produce (e.g., calculate) phase angle data (e.g., phase angle versus time data) that can be derived from the time series data (e.g., time series data 34 shown in FIG. 3C). Because the time series data has a relatively high SNR, a relatively repeatable and stable estimate of the phase angle data can be produced. Moreover, the relatively high SNR of the time series data can be used to derive phase angle data that can then be used to determine (or calculate) a relatively accurate estimate of a beat frequency.

Figure 3D:
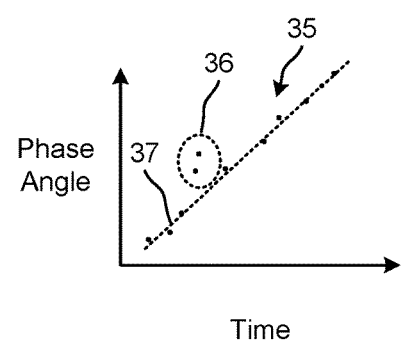

An example of phase angle versus time data 35 is illustrated in FIG. 3D. As shown in FIG. 3D, the phase angle versus time data 35 is consistent with the frequency pattern 30 illustrated in FIG. 3A. In scenarios where the frequency pattern 30 is linear as illustrated in FIG. 3A, the phase angle versus time data 35 will also be linear. A regression line 37 is included in FIG. 3D to illustrate the linearity of the phase angle versus time data 35. The regression line 37 shown in FIG. 3D is representative, and in some implementations, more than one regression line or curve can be defined based on power density versus frequency data such as the power density versus frequency data 35. In some implementations one or more regression lines can be associates with different segments of the power density versus frequency data 31. In some implementations, relatively little or no signal fade can result in a phase angle versus time data that is linear.

In some implementations, one or more regions (or datapoints) of the phase angle data that are outliers from (e.g., inconsistent with, inconsistent with other datapoints based on a threshold condition, a few outlier datapoints compared with a majority of the datapoints (based on a threshold condition), a statistical outlier from), for example, a model or target curve can be identified using an outlier analyzer 246. In some implementations, one or more regions of phase angle data that are outliers with respect to an original frequency pattern can be identified using the outlier analyzer 246. In some implementations, signal processing methods such as regression analysis or another type of statistical analysis can be used to identify regions of phase angle data that may not be consistent. In some implementations, a regression curve or other type of fitted curve can be used to identify outlier data.

Outlier phase angle data can be used to identify portions of data (e.g., combined frequency data) that should not be used (e.g., should be discarded or excluded) for further analysis or iterative calculations using the technique or process described above. For example, outlier phase angle data can be used to identify one or more portions of the original combined frequency data that should not be used in a subsequent iteration of spectral analysis using the analyzer 240. The original combined frequency data can be modified by, for example, the segment module 247. The identification of one or more outliers can be performed using one or more statistical algorithms, models, or procedures. In some implementations, outlier phase angle data can be used to identify one or more portions of data such as power density versus frequency data 31 shown in FIG. 3B, time series data 34 shown in FIG. 3C, frequency pattern 30 shown in FIG. 3A that should not be used in a subsequent iteration of spectral analysis using the analyzer 240.

As a specific example, as shown in FIG. 3D, data points 36 from the phase angle data 35 are outliers with respect to the regression line 37 through the phase angle data 35. Accordingly, combined frequency data that corresponds with the data points 36 can be eliminated from additional analysis performed by, for example, the frequency spectrum module 243, the inverse Fourier module 244, the phase angle module 245, the outlier analyzer 246, the segment module 247, and/or so forth. In other words, sections of a frequency pattern (e.g., frequency pattern 30 shown in FIG. 3A) associated with combined frequency data can be removed and the spectral analysis can be repeated. Accordingly, an improved estimate of beat frequency can be determined using the analyzer 240 without the data eliminated from the combined frequency using the outlier phase angle data.

In some implementations, portions of data associated with time series data (e.g., time series data 34 shown in FIG. 3C) that do not have the same (or relatively same) phase angle versus time trend as the remainder of the time series data can be eliminated and a Discrete Fourier Transform (DFT) computed from the remaining time series data. In such implementations, further iterative calculations using the DFT can be performed.

In some implementations, multipath effects (e.g., signal fades), which are discussed briefly above, can produce phase and/or amplitude variations during the frequency pattern (e.g., a chirp of the frequency pattern). Even if there is, for example, no (or little) phase distortion and only a relatively large amplitude reduction during a signal fade, a perturbation of the beat frequency estimate can occur. In some implementations, interpolated spectrum frequency estimates from zero filled FFT processing can be distorted for frequencies that do not fall within a spectral bin. Low amplitude data can have the same effect as changing the amount of zero filling. To compensate for the multipath effects described above, in some implementations, the analyzer 240 can be configured to remove a relatively low amplitude section associated with time series data (e.g., time series data 34), and a new zero-filled Fast Fourier Transform (FFT) generated. The analyzer 240 can be configured to implement a frequency bias adjustment to correct for the relatively shorter data segment of the time series data.

In some implementations, spectral analysis can be performed on portions of the combined frequency (or combined frequency data). In other words, the combined frequency data can be segmented into portions or sections. These portions or sections can be referred to as combined frequency segments. Time domain and/or frequency domain spectral analysis approaches can be used to estimate the phase angle trend of each of the combined frequency sections. To improve a beat frequency estimate, combined frequency sections with outlier phase angle trends (as determined by the outlier analyzer 246) can be removed and a DFT can be used to estimate beat frequency based upon the remaining combined frequency sections.

In some implementations, a relatively unbiased (e.g., accurate) spectrum estimate (and beat frequency) can be obtained through a DFT using combined frequency data without zero filling. In some embodiments, when a subset of spectral bins are selected using an FFT (during a first iteration of spectral analysis), a DFT can later be used (e.g., used in a subsequent iteration of a spectral analysis) to determine (e.g., estimate) a beat frequency.

In some implementations, a spectral analysis of combined frequency data associated with an up-chirp of a frequency pattern can yield data that is different than a spectral analysis of combined frequency data associated with a down-chirp of the same frequency pattern. The differences can be utilized to determine aspects of range and/or velocity of an object.

Referring back to FIG. 1, the LIDAR system 100 may optionally include an optical amplifier 180 configured to amplify electromagnetic radiation emitted from the optical amplifier 180. In some implementations, the LIDAR system 100 can include more than one optical amplifier. In some implementations, amplification implemented by the optical amplifier 180 may not be so high that the amplification significantly degrades the noise figure. The amplification by the optical amplifier 180, in some implementations, may be no higher than is required to achieve a desirable output power and/or amplitude flatness. The optical amplifier 180 can allow the distribution of a single laser (e.g., laser 110) to a relatively large number of measurement channels. The optical amplifier 180 can provide the ability to change the optical power output of the laser 110 to overcome, for example, relatively weak signal returns (e.g., reflected electromagnetic radiation 14). For example, transmission of the emitted electromagnetic radiation 12 through a transparent or semi-transparent material (e.g., a window) may attenuate the emitted electromagnetic radiation 12 of the laser 110. Increasing power of the emitted electromagnetic radiation 12 of the laser 110 can help to mitigate the effect of this optical loss. In some implementations, an output (or emission) of a distributed feedback (DFB) laser used as an optical source (e.g., the laser 110) in the LIDAR system 100 may not be changed directly without degrading the chirp characteristics of the optical output. In some implementations, the optical amplifier 180 can be configured to reduce the amplitude modulation of a frequency pattern (e.g., a chirped laser output) of the laser 110 through gain saturation. Reduced amplitude modulation can improve measurement quality by keeping the SNR high throughout a frequency pattern and effectively increasing the time-bandwidth product of each measurement and helps to avoid incorrectly estimated bandwidth. In some implementations, the optical amplifier 180 can be used as part of the LIDAR system 100 while still maintaining a relatively high quality frequency pattern of the emissions of the laser 110 as measured after the optical amplifier 180.

The components (e.g., modules, processors (e.g., a processor defined within a substrate such as a silicon substrate)) of the LIDAR system 100 (e.g., the analyzer 140) can be configured to operate based on one or more platforms (e.g., one or more similar or different platforms) that can include one or more types of hardware, software, firmware, operating systems, runtime libraries, and/or so forth. In some implementations, the components of the LIDAR system 100 can be configured to operate within a cluster of devices (e.g., a server farm).

In some implementations, one or more portions of the components shown in the LIDAR system 100 in FIG. 1 and/or FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the LIDAR system 100 can be, or can include, a software module configured for execution by at least one processor (not shown). In some implementations, the functionality of the components can be included in different modules and/or different components than those shown in FIG. 1 and/or FIG. 2.

In some embodiments, one or more of the components of the LIDAR system 100 can be, or can include, processors configured to process instructions stored in a memory (e.g., memory 170). For example, the analyzer 140 (and/or a portion thereof) can be a combination of a processor and a memory configured to execute instructions related to a process to implement one or more functions.

Although not shown, in some implementations, the components of the LIDAR system 100 (or portions thereof) can be configured to operate within, for example, a data center (e.g., a cloud computing environment), a computer system, one or more server/host devices, and/or so forth. In some implementations, the components of the LIDAR system 100 (or portions thereof) can be configured to operate within a network. Thus, the LIDAR system 100 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the memory 170 can be any type of memory such as a random-access memory, a disk drive memory, flash memory, and/or so forth. In some implementations, the memory 170 can be implemented as more than one memory component (e.g., more than one RAM component or disk drive memory) associated with the components of the LIDAR system 100.

Figure 4:
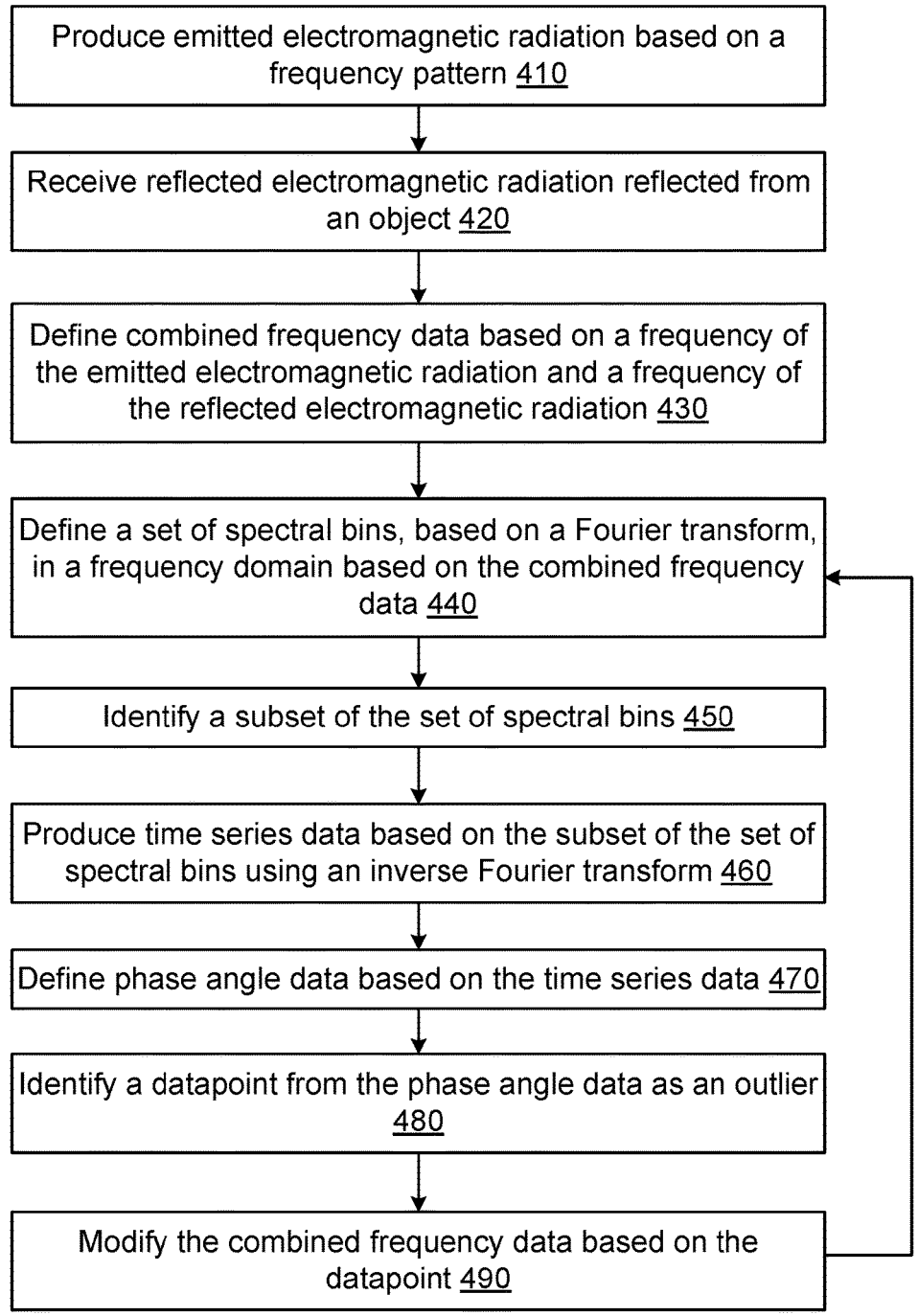
FIG. 4 is a flowchart that illustrates a spectral analysis method.

FIG. 4 is a flowchart that illustrates a spectral analysis method (also can be referred to as a process). In some implementations, the spectral analysis method described below can be performed on portions of combined frequency data. In some implementations, the spectral analysis method can be performed in hardware (e.g., in an FPGA, in a DSP). In some implementations, one or more of the portions of the spectral analysis method can be performed in a hardware pipeline. In some implementations, one or more portions of the spectral analysis method can be performed iteratively. In some implementations, an order of the portions of the spectral analysis method can be different than that shown and described below.

As shown in FIG. 4, emitted electromagnetic radiation is produced based on frequency pattern (block 410). The emitted electromagnetic radiation can be produced by a laser such as laser 110 shown in FIG. 1. The frequency pattern can be, or can include, for example, a frequency sweep including an up-chirp and a down-chirp.

Reflected electromagnetic radiation that is reflected from an object is received (block 420). In some implementations, the reflected electromagnetic radiation can be received at a receiver such as the receiver 130 shown in FIG. 1.

Combined frequency data is defined based on a frequency of the emitted electromagnetic radiation and a frequency of the reflected electromagnetic radiation (block 430). In some implementations, the combined frequency data can be produced by, for example, an analyzer such as the analyzer 140 shown in FIG. 1.

A set of spectral bins is defined, based on a Fourier transform, in a frequency domain based on the combined frequency data (block 440). The Fourier transform can be performed by a Fourier transform module such as Fourier transform module 242 shown in FIG. 2. The set of spectral bins can be defined using a frequency spectrum module such as the frequency spectrum module 243 shown in FIG. 2. One or more of the bins from the set of spectral bins can be defined based on peaks (e.g., power density peaks) associated with the bins.

At least a subset of the set of spectral bins is identified (block 450). In some implementations, the subset of the set of spectral bins (if a subset is identified) can be identified by a segment module such as the segment module 247 shown in FIG. 2. In some implementations, the subset can be defined based on one or more criteria.

Time series data is produced based on the subset of the set of spectral bins using an inverse Fourier transform (block 460). The inverse Fourier transform can be performed by an inverse Fourier transform module such as the inverse Fourier transform module 244 shown in FIG. 2.

Phase angle data is defined based on the time series data (block 470). In some implementations, the phase angle data can be defined using a phase angle module such as phase angle module 245 shown in FIG. 2. In some implementations, the phase angle data can be related to the subset of the set of spectral bins if a subset is selected and identified.

A datapoint from the phase angle data is identified as an outlier (block 480). In some implementations, the datapoint can be identified using an outlier analyzer such as the outlier analyzer 246 shown in FIG. 2. In some implementations, the datapoint can be identified using one or more statistical algorithms, models, or procedures.

The combined frequency data is modified based on the datapoint (block 490). In some implementations, a portion of the combined frequency data can be eliminated (e.g., excluded, discarded) for further analysis based on the datapoint. In some implementations, the combined frequency data can be modified using a segment module such as the segment module 247 shown in FIG. 2.

As shown in FIG. 4, portions of the spectral analysis method can be iteratively performed as represented by the arrow from block 490 to block 440. In this example, after the modification of the combined frequency data (block 490), the modified combined frequency data can be processed at block 440. In some implementations, a subset of portions of the spectral analysis method (which can be different than the subset shown in FIG. 4) can be iteratively performed.

Although not illustrated in FIG. 4, in some implementations, one or more portions of the combined frequency data can be segmented before processing is performed using at least a portion of the blocks 440 through 490. In some implementations, after being segmented, a subset of the portions may be processed using at least a portion of the blocks 440 through 490. In some implementations, such segmenting can be performed by a segment module.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What may be claimed is:

1. A non-transitory computer-readable storage medium storing instructions that when executed cause one or more processors to perform a process, the process comprising:
   producing emitted electromagnetic radiation based on a frequency pattern;
   receiving reflected electromagnetic radiation reflected from an object;
   defining combined frequency data based on a frequency of the emitted electromagnetic radiation and a frequency of the reflected electromagnetic radiation; and
   defining a set of spectral bins, based on a Fourier transform, in a frequency domain based on the combined frequency data,
   wherein the process further comprises:
     identifying a subset of the set of spectral bins; and
     producing time series data based on the subset of the set of spectral bins using an inverse Fourier transform.

2. The non-transitory computer-readable storage medium of claim 1, further comprising:
   defining a frequency based on the set of spectral bins.

3. The non-transitory computer-readable storage medium of claim 1, wherein the identifying the subset of the set of spectral bins is based on a criteria related to a number of spectral bins adjacent a maximum spectral bin.

4. The non-transitory computer-readable storage medium of claim 1, further comprising:
   defining phase angle data based on the time series data.

5. The non-transitory computer-readable storage medium of claim 4, further comprising:
   identifying a datapoint from the phase angle data as an outlier.

6. The non-transitory computer-readable storage medium of claim 5, further comprising:
   modifying the combined frequency data based on the datapoint.

7. The non-transitory computer-readable storage medium of claim 1, further comprising:
   dividing the combined frequency data into at least a first segment of combined frequency data and a second segment of combined frequency data,
   the defining of the set of spectral bins is based on the first segment of the combined frequency data.

8. The non-transitory computer-readable storage medium of claim 7, further comprising:
   identifying the first segment of the combined frequency data as an outlier segment of the combined frequency data.

9. The non-transitory computer-readable storage medium of claim 1, wherein the emitted electromagnetic radiation is amplified by an optical amplifier.

10. An apparatus, comprising:
a laser configured to produce emitted electromagnetic radiation based on a frequency pattern;
a receiver configured to receive reflected electromagnetic radiation reflected from an object; and
an analyzer configured to define combined frequency data based on a frequency of the emitted electromagnetic radiation and a frequency of the reflected electromagnetic radiation, the analyzer configured to iteratively perform spectral analysis on the combined frequency data until a beat frequency is determined based on a threshold condition,
wherein the spectral analysis includes producing time series data based on a set of spectral bins using an inverse Fourier transform.

11. The apparatus of claim 10, wherein the spectral analysis further includes:
defining a set of spectral bins, based on a Fourier transform, in a frequency domain based on the combined frequency data; and
identifying a subset of the set of spectral bins.

12. The apparatus of claim 11, wherein the identifying the subset of the set of spectral bins is based on a number of spectral bins adjacent a maximum spectral bin.

13. An apparatus, comprising:
a laser configured to produce emitted electromagnetic radiation based on a frequency pattern;
a receiver configured to receive reflected electromagnetic radiation reflected from an object;
an analyzer configured to define combined frequency data based on a frequency of the emitted electromagnetic radiation and a frequency of the reflected electromagnetic radiation, the analyzer configured to iteratively perform spectral analysis on the combined frequency data until a beat frequency is determined based on a threshold condition,
wherein the spectral analysis includes defining phase angle data based on time series data.

14. The apparatus of claim 13, wherein the spectral analysis further includes identifying a datapoint from phase angle data as an outlier.

15. The apparatus of claim 14, wherein the spectral analysis further includes modifying the combined frequency data based on the datapoint.

16. The apparatus of claim 10, wherein the spectral analysis further includes:
dividing the combined frequency data into at least a first segment of combined frequency data and a second segment of combined frequency data.

17. The apparatus of claim 10, wherein the threshold condition includes performing a specified number of iterations.

18. The apparatus of claim 10, wherein the emitted electromagnetic radiation is amplified by an optical amplifier.

19. A method, comprising:
defining combined frequency data based on a frequency of electromagnetic radiation emitted toward an object from a laser and a frequency of electromagnetic radiation reflected from the object;
defining a set of spectral bins based on the combined frequency data;
identifying a subset of the set of spectral bins;
producing time series data based on the subset of the set of spectral bins
defining phase angle data based on the time series data; and
modifying the combined frequency data based on the phase angle data.

20. The method of claim 19, wherein the identifying the subset of the set of spectral bins is based on a criteria related to a number of spectral bins adjacent a maximum spectral bin.

21. The method of claim 19, wherein the set of spectral bins is defined using a Fourier transform in a frequency domain, and the producing time series data is based on the subset of the set of spectral bins using an inverse Fourier transform.

22. The method of claim 19, further comprising:
amplifying the electromagnetic radiation emitted toward the object from the laser.

* * * * *